United States Patent [19]

Coleman et al.

[11] 4,359,144
[45] Nov. 16, 1982

[54] SELF-ADJUSTING BRAKE

[75] Inventors: David L. Coleman; John J. Kass, both of Dubuque, Iowa

[73] Assignee: Deere & Company, Moline, Ill.

[21] Appl. No.: 200,235

[22] Filed: Oct. 24, 1980

[51] Int. Cl.³ .................. F16D 49/12; F16D 65/56
[52] U.S. Cl. .......................... 188/77 R; 188/79.5 K; 188/196 BA; 192/80; 192/111 A
[58] Field of Search ............... 188/77 R, 75, 196 BA, 188/200, 79.5 K; 192/80, 111 A

[56] References Cited

U.S. PATENT DOCUMENTS

| | | | |
|---|---|---|---|
| 2,400,359 | 5/1946 | Lear et al. | 188/77 R |
| 3,692,152 | 9/1972 | Larsson | 188/79.5 R |
| 3,727,728 | 4/1973 | Bostwick | 188/196 BA X |
| 3,820,636 | 6/1974 | Kass | 188/77 R |

FOREIGN PATENT DOCUMENTS 528309  10/1940  United Kingdom ............ 188/77 R Primary Examiner—George E. A Halvosa

[57] ABSTRACT

An external band brake control linkage includes a pair of anchor pins which are respectively connected to the opposite ends of a brake band. The linkage being operable between a normal released condition holding the anchor pins spaced apart so as to maintain the band disengaged from the brake drum and an operative condition wherein the anchor pins are moved together from the position they occupy when the linkage is in its released condition wherein the brake band is engaged with the brake drum. For the purpose of compensating brake band wear, the control linkage includes a link having a ratchet wheel-type adjusting nut threaded on a rod-like link thereof, the adjusting nut being advanced so as to change the spacing between the anchor pins. A paw or an adjusting nut operating lever is carried by a link of the control linkage and is operative in response to the link undergoing a predetermined movement, corresponding to brake band wear, to index the adjusting nut so as to compensate for wear.

3 Claims, 3 Drawing Figures

SELF-ADJUSTING BRAKE

BACKGROUND OF THE INVENTION

The present invention relates to a self-adjusting linkage for controlling a brake and more particularly relates to such linkage for controlling a brake of an external band type.

Control linkage for external band brakes are known which are the type including a pair of anchor pins respectively connected to the opposing end of a brake band and operative for anchoring one end of the brake band to the brake housing, when the brake drum is rotating in a first direction, while simultaneously moving the other end of the brake band towards the one end, and for anchoring the other end of the brake band to the housing, when the brake drum is rotating in the opposite direction, while simultaneously moving the one end of the brake band towards the other end. These linkages are constructed so as to dispose the brake band such that a desired gap exists between the brake band and the brake drum when they are in a released condition, and such that the band is moved a predetermined distance to cause its engagement with the brake drum when the actuating linkage is in an actuated condition. As a brake band wears, the desired gap between the band and the drum is no longer maintained and the linkage must be overtravelled to apply the brake band against the brake drum. While a certain amount of overtravel can be designed into the linkage it is usually more desirable, because of space limitations and the like, to maintain the amount of linkage travel within a predetermined range.

To minimize the effects of brake band wear on the operation of the control linkage, it is known to provide brake control linkages, with automatically adjust means which are responsive to the predetermined amount of movement of the control linkage beyond that necessary to cause full engagement of an unworn brake band to change the release condition distance between a brake band end so as to compensate for wear of the brake bands. Heretofore, the self-adjusting means have not been entirely satisfactory, due to their being complex and somewhat unreliable in operation.

SUMMARY OF THE INVENTION

It is therefore an objective of the present invention to provide a self-adjusting linkage for use in controlling the application of a brake band of the external type, the self-adjusting linkage being simple and reliable in construction. Another objective of the present invention is to provide such a self-adjusting linkage which will operate to constantly maintain the amount of linkage movement necessary to cause brake application within a predetermined range thereby eliminating the need for undue overtravel of the linkage beyond that movement necessary for causing the full engagement of an unworn brake band.

According to the present invention, there is provided a control linkage which interconnects the opposing end of a brake band and is operative to hold the opposing brake band ends in fixed, spaced relationship to each other when the linkage is in a normal released condition and including a link, the effective length of which is automatically adjusted for effecting changes in the spaced relationship between the brake band ends in response to a pre-determined movement of the linkage which reflects brake band wear, the adjustment compensating for the wear. More specifically, according to the present invention there is provided a link having a ratchet wheel-type nut threaded on one end thereof and movable for adjusting the effective length of the link, the nut having a circular disposition having teeth about the periphery thereof and a paw or adjusting lever being biased to contact with the disc position and being operative to index the adjusting nut when the control linkage has undergone a predetermined movement from its release condition and to cause movement of the adjusting nut when a control linkage has returned to its released condition.

DETAILED DESCRIPTION OF THE PREFERRED EMBODIMENT

Figure 1:
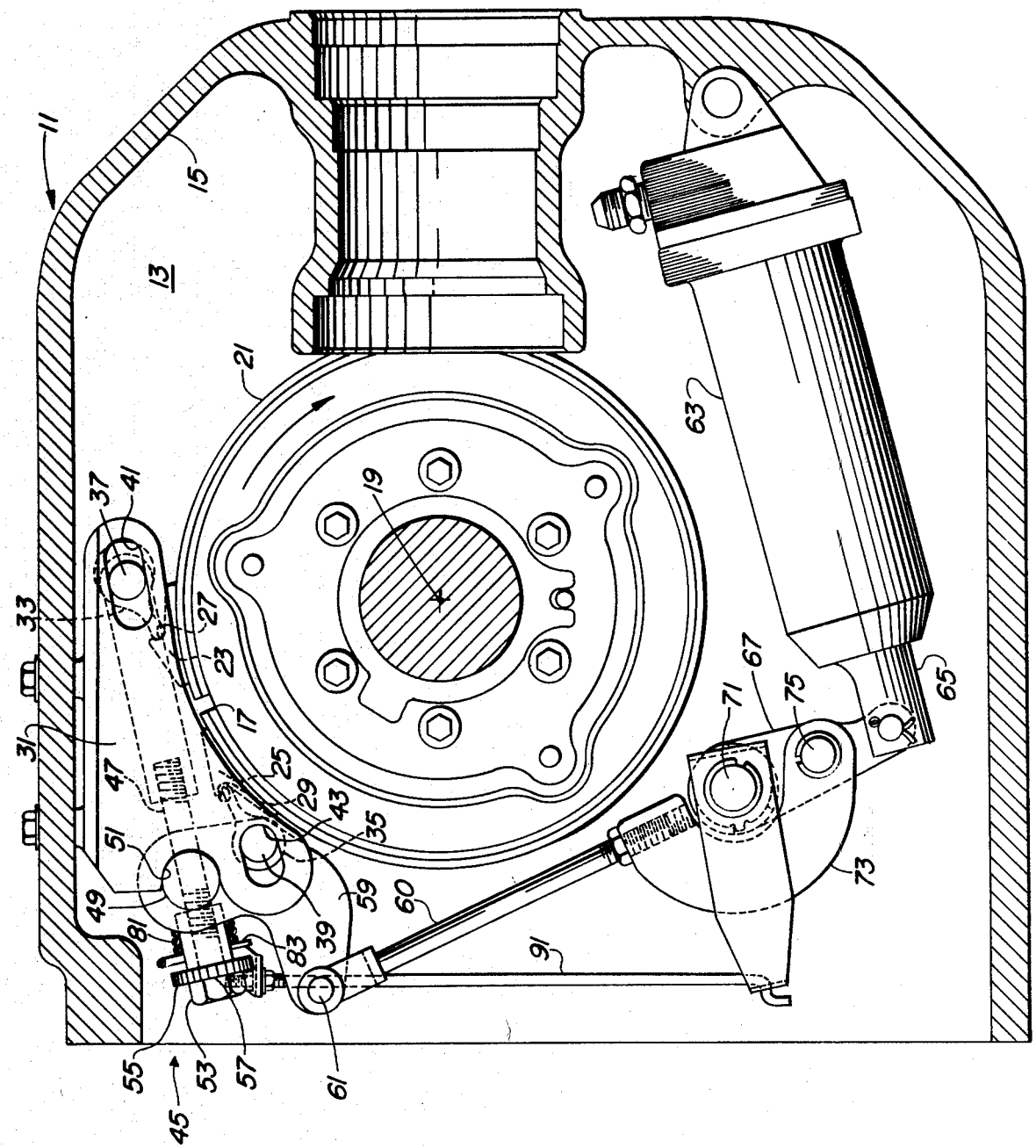
FIG. 1 is a side elevational view of the control linkage of the present invention mounted in a brake housing, the housing being only partially shown and having parts shown in sections and broken away so as to reveal the control linkage.

Referring now to FIG. 1, therein is shown a brake assembly indicated in its entirety by the numeral 11. The brake assembly 11 includes a housing 15 defining a cavity 13 in which is located a cylindrical brake drum 17 which is mounted in the housing for forward and reverse rotation by any conventional means about a transverse axis located at 19, the forward direction of rotation being clockwise as viewed in FIG. 1. Encircling a substantial portion of the brake drum 17 is a brake band 21 having opposite spaced apart ends comprising first and second brake band end members 23 and 25 respectively defining oppositely opening seats 27 and 29. The brake band 21 is illustrated somewhat schematically and is shown in an engaged condition wherein it is in contact with the brake drum 17. The end members 23 and 25 extend between the opposite sides of an inverted channel-like mounting member 31 which is rigidly secured to the housing 15 by any conventional means. Also extending between the opposite sides of the mounting member 31 are first and second generally wedge-shaped struts 33 and 35, respectively, having rounded ends which are disposed in the seats 27 and 29 of the brake band end members 23 and 25. The first and second struts 33 and 35 are swivably mounted on first and second anchor pins 37 and 39, respectively, the anchor pin 37 having its opposite ends received in transversely aligned slot-like openings 41 formed in the opposite sides of the mounting member 31 and the second pin 39 having its opposite ends received in a pair of transversely aligned slot-like openings 43 respectively formed in the opposite sides of the mounting member 31. The pair of openings 41 and 43 are elongated to allow struts 33 and 35 to move along respective paths which converge at a location spaced radially outwardly from axis 19 and generally between the brake band end members 23 and 25.

Figure 3:
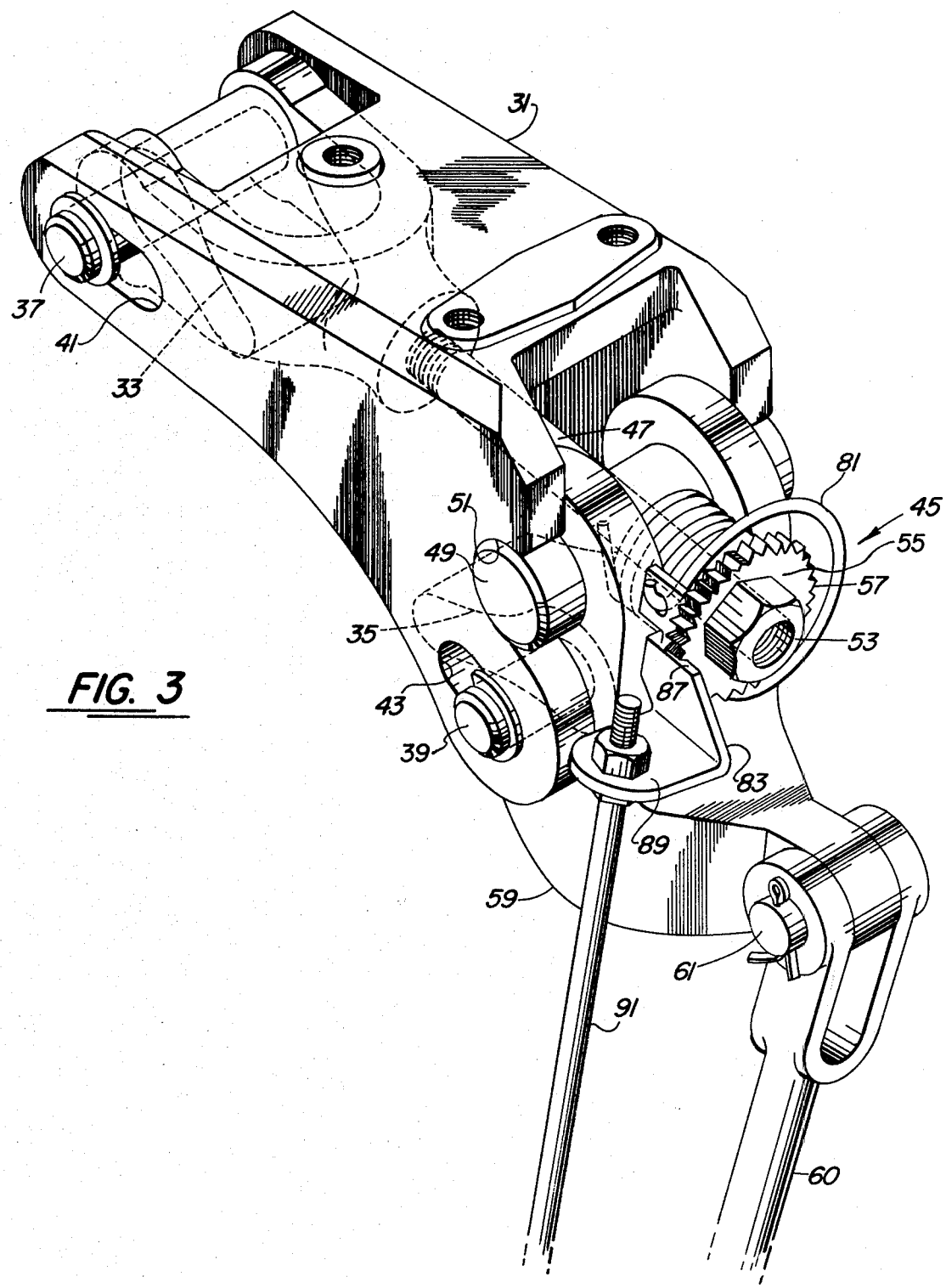
FIG. 3 is an exploded view of the brake control linkage activation system.

Referring to FIG. 1 and more particularly to FIG. 3, a control linkage, generally indicated as 45, is provided for controlling the movement of the anchor pins 37 and 39 and hence the movement of the opposite ends of the brake band 21 so as to effect engagement and disengagement of the brake band with the brake drum 17. The control linkage 45 comprises a link train including a motion transfer link 47 positioned between the opposite side walls of the mounting member 31 and having a yoke-like left hand end, as shown in FIG. 3, pivotally connected to the first anchor pin 37 and having a rod-like right hand end slidably received in a crossbore located in a third anchor pin 49. The third anchor pin 49 extends parallel to the transverse axis 19 and is illustrated in a position wherein it is seated against transversely aligned complementary bearing surfaces 51 formed in the right hand end of the sides of the mounting member 31, the bearing surfaces 51 being radially outward from the pair of slot-like openings 43. The right hand end of the motion transfer linkage 47 is threaded and has an adjusting nut 53 threaded thereon. The outer end of the adjusting nut 53 is in the form of a circular disc 55 having a plurality of equally spaced teeth 57 located around the periphery thereof. A bell crank-like actuating lever 59 has a yoke-like left hand portion located partially between the opposing side walls of the mounting member 31 and having the second and third anchor pins 39 and 49, respectively, pivotally received therein, the actuating lever 59 thus being floatatably connected to the mounting member 31 for a purpose described hereinafter. A connecting link 60 has a bifurcated upper end portion and straddled relationship to the right hand end of the actuating lever 59 and is pivotally connected thereto by a pin 61.

Figure 2:
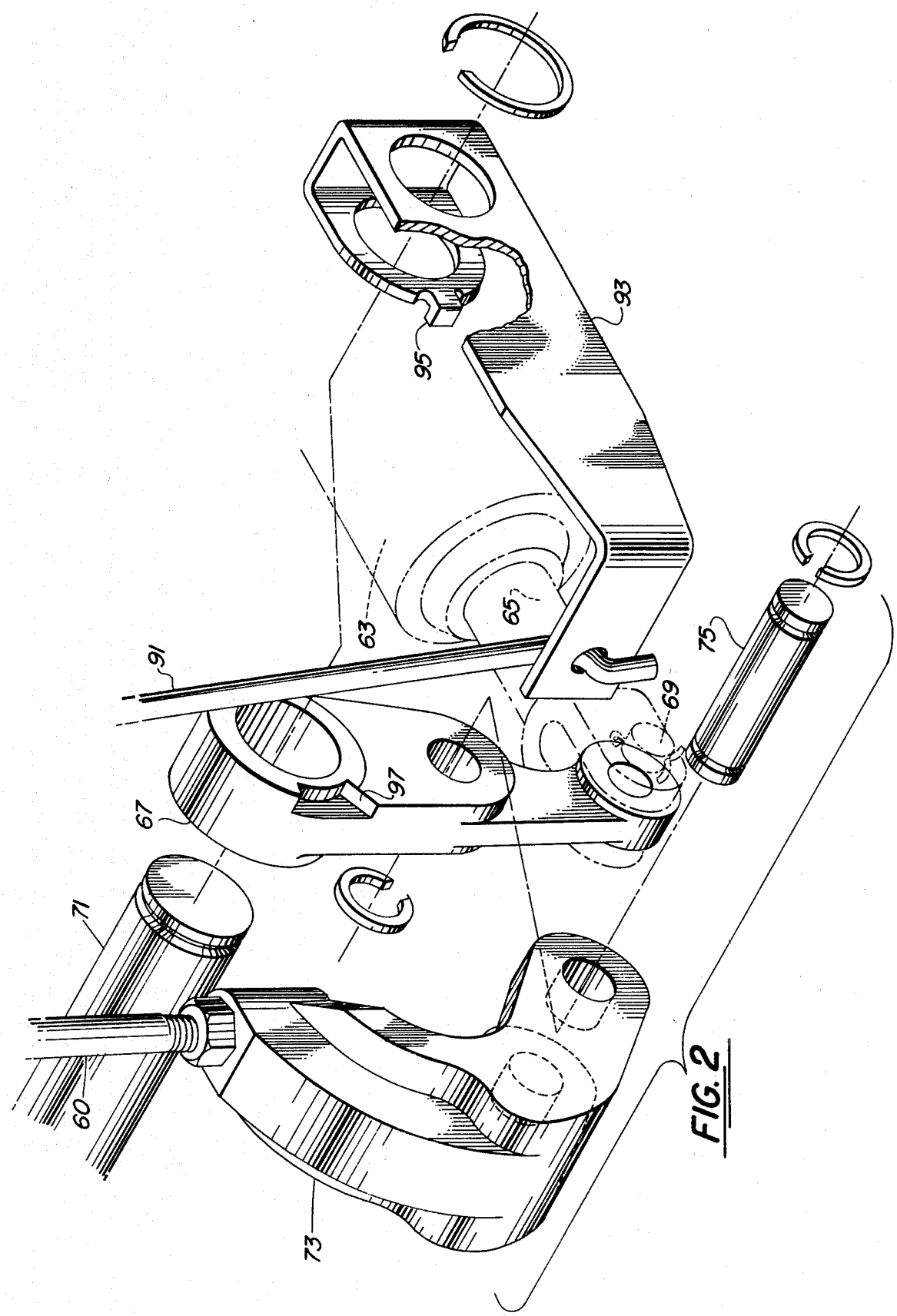
FIG. 2 is a perspective view of the brake control application linkage.

Referring to FIG. 1 and more particularly to FIG. 2, a hydraulic actuating cylinder 63 is pivotally mounted within the brake housing 15 having a cylinder arm 65 with a yoke-like left hand end extendable from the hydraulic cylinder. A second motion transfer link 67 is pivotally connected to the hydraulic cylinder arm 65 by pin 69 at the yoke-like end. A second pin 71 is fixably mounted by any conventional means to the housing 15 and extends parallel to axis 19. The other end of the motion transfer link 67 is pivotally maintained to pin 71 by any conventional means. A brake actuating link 73 which has a yoke-like bottom end is pinned generally midway along the motion transfer link 67 by pin 75. The rod 60 is threadedly engaged to the upper end of the brake actuating link 73. It is observed that brake actuation is achieved by the withdrawal of the hydraulic cylinder arm 65 within the hydraulic cylinder 63. This motion causes the second motion transfer link 73 to travel a sufficient distance causing connecting link 60 and actuating lever 59 to float within the mounting member 31 until pin 49 is seated within the bearing surfaces 51 when the brake drum is rotating in a direction indicated in FIG. 1, at which point pin 49 becomes a pivotal point for the actuating lever 59 such that the lever 59 rotates thereabout to cause the pin 39 which engages the first wedge-shaped strut 35 to move the brake band seat 25 resulting in the application of the brakes. It is further observed that should the brake drum 17 be rotating in the opposing direction as indicated in FIG. 1, the actuating lever 59 will be seated by pin 39 to the mounting member 31 to allow pin 49 which abuts the adjusting nut 53 to move away from bearing surface 51 causing the motion transfer link 47 to displace longitudinally and thereby forcing the second wedge-shaped strut 33 to move the seat 27 resulting in the application of the brake.

Referring to FIG. 1 and more particularly to FIG. 3, to accomplish self-adjustment, a torsion spring 81 is looped around the adjustment nut 53 between pin 49 and disc 55 such that one end of the spring is biased against the interior surface of the actuating lever 59 in the forked area. The other end of the tension spring 81 is hooked to an adjusting link 83 to bias the adjusting link 83 against the adjustment nut 53 such that a surface 87 of adjusting link 83 is aligned to the teeth 57 of the adjusting nut 53. A connecting rod 91 is then fixably mounted to the adjusting link 83 at one end and is swivably mounted by any conventional means to a linking arm 93 at its other end (refer to FIG. 2). The linking arm 93 is pivotally mounted to pin 71 and has a rider 95 aligned to move within a groove 97 on the motion transfer link 67. The groove 97 is sized such that during normal operation, the rider 95 does not contact the end walls of groove 97. Should the travel distance required to activate the braking system exceed a predetermined amount which is equivalent to the known brake travel distance required to activate the braking system which may result due to wear of the brake bands 21, the rider 95 will bottom-out in groove 97 and linking arm 93 will pivot about pin 71. The connecting rod 91 is pulled by member 93 in a generally downward direction to advance the adjusting link 83 on the teeth 57 of the nut 53 such that release of the brakes thereafter allows the spring 81 to bias the member 83 such that the adjusting nut 53 is rotated causing the system to compensate for band wear.

I claim:

1. In a brake construction of the type including a brake band substantially encircling a brake drum mounted on a support for rotation about a fixed axis, the brake band having first and second spaced ends connected to a control linkage selectively operable between a normal released condition, towards which the linkage is biased and wherein the brake band ends are positioned such that the band is spaced from said drum, and a brake-applying condition, wherein the brake band ends are positioned closer together than when in their released positions and the band is in engagement with said drum, said control linkage having first and second anchor pins respectively connected to the first and second ends of the brake band and extending parallel to said axis, said support having means guidingly retaining said first and second anchor pins for limited movement towards and away from each other, a lever having said second anchor pin mounted therein, a third anchor pin mounted in said lever, said support including surface means defining a seat-shaped complementary to and disposed so as to receive said third anchor pin when the linkage is in said released condition, a motion-transmitting link connected between said first and third anchor pins and including rotatable ratchet wheel means operable for adjusting the released position of said first anchor pin so as to compensate for brake band wear, wherein the improvement comprises: an adjusting means for indexing said ratchet wheel means; a control linkage actuating means for causing said control linkage to assume a released condition or a brake applied condition, said adjusting means being connected between said ratchet wheel means and control linkage actuating means and operable in response to a predetermined movement of said actuating means to a brake applied condition to index said ratchet wheel means upon the linkage returning to said released condition, said control linkage actuating means including: a hydraulic cylinder having a cylinder arm linearly movable; a connecting link pivotally mounted to said lever at one end; a second motion transmitting link pivotally mounted to said cylinder arm at one end and pivotally mounted to the housing at the other end, said connecting link being pivotally mounted along said second motion transmitting link such that movement of said cylinder arm causes said lever to rotate about said second or third pins.

2. A brake construction as claimed in claim 1 wherein said adjusting means comprises: an adjusting link biased to have a surface engaging said ratchet wheel means; biasing means for biasing said adjusting link such that said surface of said adjusting link can index said ratchet wheel means; adjusting rod fixably mounted to said adjusting link; and responsive means for causing said adjusting rod to move said adjusting link to assume an indexing position with respect to said ratchet wheel means when said cylinder arm has moved beyond a predetermined amount.

3. A brake construction as claimed in claim 2 wherein said response means comprises: a linking arm communicating with said adjusting rod and having a rider to ride within a groove in said second motion transmitting link such that should said cylinder arm move beyond a predetermined amount, said rider will bottom-out in said groove to cause said linking arm to rotate, resulting in said adjusting rod to position said adjusting link in indexing orientation to said ratchet wheel means.

* * * * *